US012645006B2

(12) United States Patent
Lupini et al.

(10) Patent No.: US 12,645,006 B2
(45) Date of Patent: Jun. 2, 2026

(54) PORTABLE BORE HOLE MEASUREMENT DEVICE

(71) Applicants: Key Logic Inc., Sudbury (CA);
GeoSight Inc., Bowmanville (CA)

(72) Inventors: Dean Lupini, Sudbury (CA); Shawn W. Romkey, Oshawa (CA)

(73) Assignees: GEOSIGHT INC., Bowmanville (CA);
KEY LOGIC INC., Sudbury (CA)

( * ) Notice: Subject to any disclaimer, the term of this patent is extended or adjusted under 35 U.S.C. 154(b) by 691 days.

(21) Appl. No.: 17/652,762

(22) Filed: Feb. 28, 2022

(65) Prior Publication Data

US 2022/0276406 A1    Sep. 1, 2022

(51) Int. Cl.
G01V 11/00 (2006.01)
(52) U.S. Cl.
CPC ................................ G01V 11/002 (2013.01)
(58) Field of Classification Search
CPC .................................................... G01V 11/002
USPC ...................................................... 73/115.02
See application file for complete search history.

(56) References Cited

U.S. PATENT DOCUMENTS

2007/0181298 A1*   8/2007   Sheiretov ............ E21B 17/1021
                                                              166/212
2018/0216430 A1*   8/2018   Stewart ................... E21B 23/02
2019/0195027 A1*   6/2019   Samuel ................. E21B 17/021

FOREIGN PATENT DOCUMENTS

CN          105221135 A   *   1/2016

OTHER PUBLICATIONS

An et al. Machine translation of CN-105221135-A. Published Jan. 2016. Accessed May 2025. (Year: 2016).*

* cited by examiner

*Primary Examiner* — Walter L Lindsay, Jr.
*Assistant Examiner* — Philip T Fadul
(74) *Attorney, Agent, or Firm* — STETINA GARRED BRUCKER & NEWBOLES

(57) ABSTRACT

A portable device for measuring characteristics of a bore hole includes a base station that includes one or more locking elements to secure the base station to the bore hole. A downhole probe can be lowered from the base station and measurements made with sensors on the probe. A travel measurement device measures the distance the probe has travelled from the base station.

20 Claims, 9 Drawing Sheets

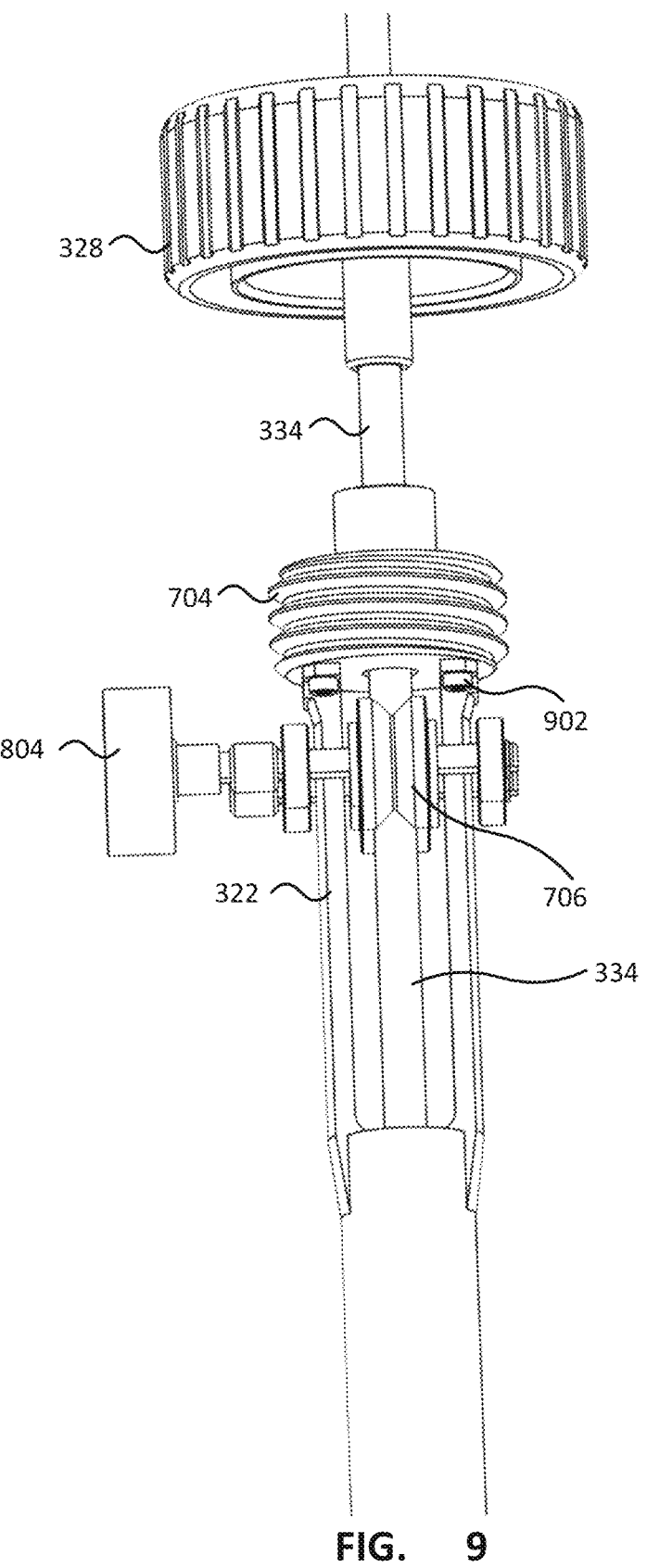
FIG.    9

PORTABLE BORE HOLE MEASUREMENT DEVICE

CROSS-REFERENCE TO RELATED APPLICATIONS

The current application claims priority to Canadian patent application 3,110,794 filed Mar. 1, 2021 and titled "Portable Bore Hole Measurement Device," the entire contents of which is incorporated herein by reference.

STATEMENT RE: FEDERALLY SPONSORED RESEARCH/DEVELOPMENT

Not Applicable

BACKGROUND

Technical Field

The current description relates to devices for measuring characteristics of bore holes and in particular to portable devices for measuring the characteristics.

Background

Explosives are an important part of mining operations. Holes may be bored in a particular pattern and then explosives placed within the holes and detonated. The burden may then be removed. The blast design may rely upon the precise location of the bored holes. However, the drilling of the holes may not be located in the expected position and/or orientation.

Downhole measurement devices can be used to measure characteristics of the bored holes. These measurement devices may comprise one or more sensors, such as an inertial measurement unit (IMU), and are lowered down the bore hole while capturing measurements.

While existing downhole measurement devices may be able to provide useful measurements, they may be slow to use and may not provide sufficiently accurate measurements. An additional, alternative and/or improved bore hole measurement device is desirable.

BRIEF SUMMARY

In accordance with the present disclosure there is provided a portable bore measurement device comprising: a probe sized to move down and up a bore to be measured, the probe comprising one or more sensors for measuring one or more bore characteristics; and a base for placement at least partially over the bore to be measured, the base comprising: a locking element for securing the base relative to the bore; and a probe travel measurement device connected to the probe for determining a distance the probe has moved within the bore relative to the base.

In a further embodiment of the device, the locking element device centers the probe mount within the bore and secures the base to the bore.

In a further embodiment of the device, the locking element comprises a plurality of hinged arms that can be extended radially outwards from a portion of the base located within the hole by reducing a distance between a lower portion of the hinged arms and an upper portion of the hinged arms.

In a further embodiment of the device, the device further comprises: a threaded sleeve; an actuator wheel rotatably mounted in the base and attached to the threaded sleeve; a threaded moving block engaged with the threaded sleeve to translate the rotational movement of the threaded sleeve to linear motion of the threaded moving block; and a moveable piston located within an in-hole portion of the base and secured to the threaded moving block, wherein first ends of the hinged arms are pivotally attached to the moveable piston and second ends of the hinged arms are pivotally attached to a fixed portion of the in-hole portion of the base.

In a further embodiment of the device, the locking element device comprise one or more extendable supports that can be extended to contact walls of the bore.

In a further embodiment of the device, the locking element device comprise an inflatable section of a portion of the base located within the hole that can be inflated to contact walls of the bore.

In a further embodiment of the device, the locking element device is operated by an electrically controlled actuator.

In a further embodiment of the device, the locking element device is operated by a manual actuator located on an external portion of the base when the base is placed at least partially over the bore.

In a further embodiment of the device, the probe comprises one or more centering devices for centering the probe within the bore.

In a further embodiment of the device, the one or more centering devices of the probe are detachable from the probe.

In a further embodiment of the device, the probe travel measurement device comprises: a rod or tape secured to the probe; and a sensor in the base to measure an amount of the rod passing through the sensor.

In a further embodiment of the device, the rod or tape is used to retract the probe to the base.

In a further embodiment of the device, the probe travel measurement device comprises the rod and is used to extend the probe from the base through the bore.

In a further embodiment of the device, the rod comprises a rigid or semi-rigid rod that extends out through the base.

In a further embodiment of the device, the probe travel measurement device comprises a plurality of rigid or semi-rigid rods that can be secured together end-to-end.

In a further embodiment of the device, the rod engages a roller causing the roller to rotate as the rod is paid out and retracted, the probe travel measurement device comprising a rotational encoder for determining an amount of rotation of the roller.

In a further embodiment of the device, the probe travel measurement device comprises the tape and wherein the tape is retractable onto a spool.

In a further embodiment of the device, the base comprises an in-hole section that comprises an engagement surface that orients the probe into a known position and orientation when the probe is retracted onto the probe mount.

In a further embodiment of the device, the engagement surface of the in-hole section comprises an angled bearing surface and wherein the probe comprises a corresponding angled bearing surface.

In a further embodiment of the device, the base comprises electronics for collecting measurements of the device including a distance from the base to the probe determined from the probe travel measurement device and one or more orientation measurements determined from the one or more sensors of the probe.

In a further embodiment of the device, the one or more sensors of the probe comprise one or more of: a magnetometer; an inertial measurement unit; an accelerometer; a gyroscope; and a laser.

BRIEF DESCRIPTION OF THE DRAWINGS

Further features and advantages of the present disclosure will become apparent from the following detailed description, taken in combination with the appended drawings, in which:

FIG. 9 depicts further inner details of the base station of FIG. 6.

DETAILED DESCRIPTION

A portable bore hole measurement device allows measuring bore hole characteristics quickly and accurately. The measurement device uses a base station that a downhole probe is seated in. The base station and probe can be seated over a bore hole so that the probe is within the bore. The base station includes one or more locking elements that can be operated to secure the base station in place. The locking elements may also center the base station relative to the bore hole. Once the base station is locked in place, the probe may be released down the hole in order to take measurements with the probe's sensors. Once the probe has passed down the hole, it can be retracted back to the base station. In order to improve the accuracy of the measurements, the base station and probe are connected together by a travel measurement device that can measurement the distance the probe has travelled from the base station. The measurements between the probe sensors and the travel measurement device may be synchronized and combined to provide an accurate mapping of the bore hole. Once the probe is re-seated in the base station, the base station may then be removed from the bore hole and positioned into another hole.

The portable bore hole measurement device allows a single technician to quickly and accurately measure the bore hole characteristics of a plurality of bore holes of a blast pattern. The blast pattern can be confirmed or adjusted based on the measurement information. In order to locate the position of the bore holes measured by the device, the device may include positioning devices that may include for example a laser for locating the device relative to one or more physical objects whose location is known. Additionally or alternatively, the positioning device may include a reflecting survey prism that allows one or more lasers to determine the distance of the device from known locations.

Figure 1:
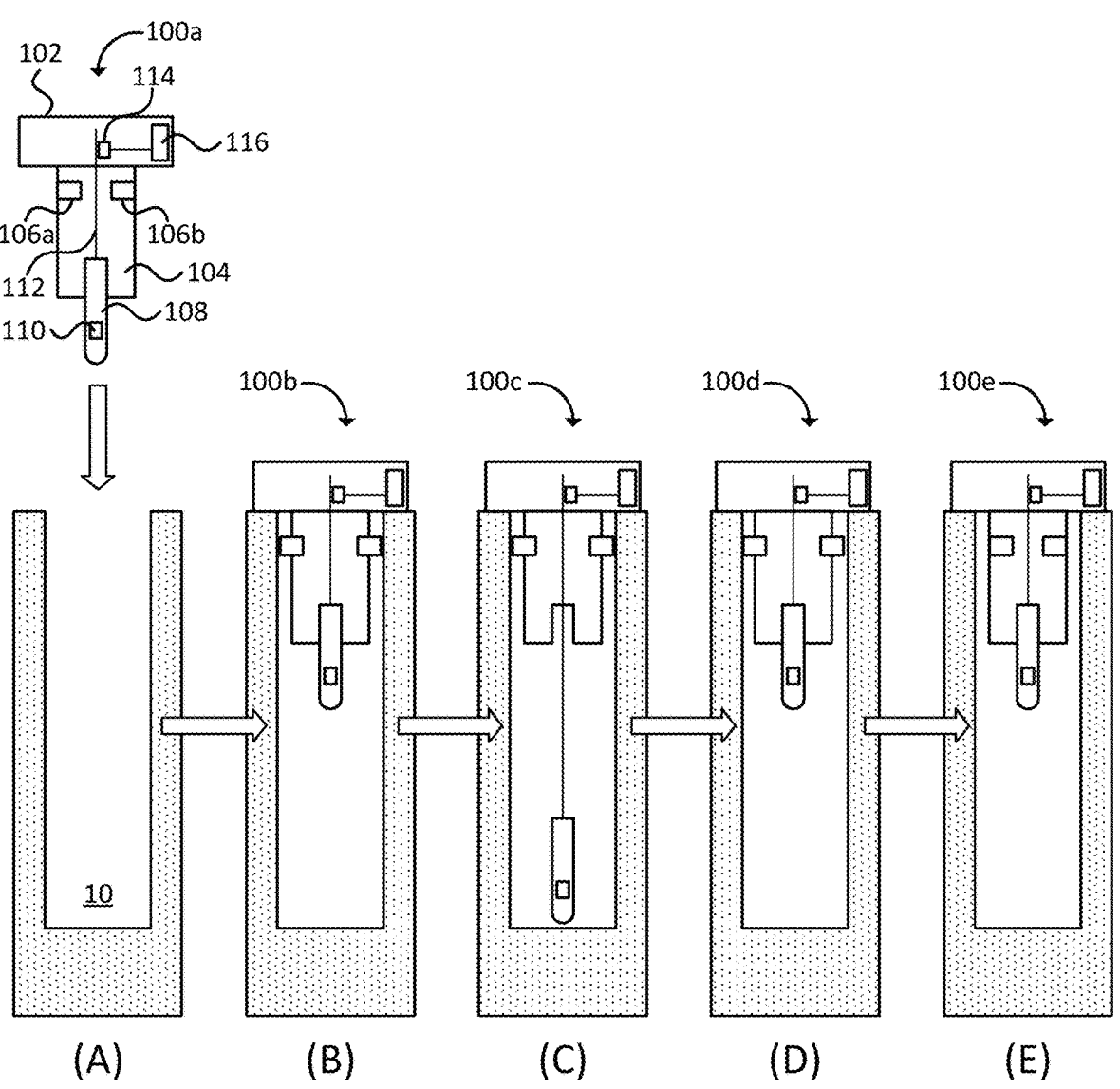
FIG. 1 depicts a block diagram of a bore hole measurement device and its use.

FIG. 1 depicts a block diagram of a bore hole measurement device and its use. A portable bore hole measurement device is depicted in a number of different arrangements 100a, 100b, 100c, 100d, 100e within a bore hole 10. The device comprises a base station 102 that has an upper portion that is sized such that it does not enter the bore hole and an in-hole portion 104 that is received within the bore hole. The in-hole portion 104 includes one or more locking elements, with two depicted schematically in FIG. 1 as blocks 106a, 106b (referred to collectively as locking element 106), that secure the base station 102 to the bore hole. In addition to securing the base station to the bore hole, the one or more locking elements may also help to center the base station, or at least the in-hole portion 104, within the bore hole.

A downhole probe is seated at least partially within an end of the in-hole portion 104 of the base station. The downhole probe 110 includes one or more measurement sensors for measuring characteristics of the bore hole. For example, the sensors may include one or more position/orientation measurement devices such as inertial measurement units (IMUs) accelerometers, gyroscopes, etc. Additional sensors may be incorporated into the probe such as magnetometers, temperature sensors, optical sensors or other sensors useful in measuring particular characteristics of the bore hole.

The probe 108 may be connected to the base station 192 via a travel measurement device 112 that can be used in determining a distance the probe has travelled from the base station 102. The travel measurement device 112 may be for example a tape, rod, shaft or other similar device. The travel measurement device 112 can be paid out as the probe passes down the hole and retracted as the probe returns to the base station 102. It will be appreciated that although the probe is described as being passed down the bore hole, the bore hole does not need to be arranged in a downward orientation and may be oriented in various ways including horizontally or overhead. Regardless of the physical orientation of the bore hole, passing the probe down the bore hole will be understood as passing the probe in the bore hole toward an end opposite the opening where the base station is located.

As the probe 108 passes down and up the bore hole, the amount of the travel measurement device 112 that has been paid out or recovered may be measured by a sensor 114 of the travel measurement device. The travel sensor may take numerous forms, including for example optical measurement devices, encoders or other types of sensors. The travel sensor 114 may be connected to electronics 116 of the device. The electronics 116 may include an interface for communicating with the sensors 110 of the probe in order to receive the measurement information and fuse the probe sensor measurements with the travel sensor measurements to determine the bore hole characteristics. The characteristics may include for example precise location information about the bore hole in 3D space.

As depicted in the first arrangement of the device 100a, the base station 102 along with the seated probe 108 can be placed into the bore hole 10. The locking elements 106 may be engaged to extend outward from the in-hole portion 104 of the base station and contact the bore walls as depicted by the device arrangement 100b. The locking elements 106 may be engaged in a number of ways, including manually, electronically, hydraulically, etc. While it is possible to engage the locking elements in a number of ways, a relatively simple mechanical mechanism may be sufficient and provide a simple and robust interface suitable for mine environments.

Once the locking elements are engaged, the probe 108 may be lowered down the hole and measurements taken by the probe sensors 110 as well as the sensor of the travel measurement device as depicted by the arrangement of the device 100c. The sensors may record a series of measurements as the probe is lowered and retracted. The probe may be lowered by paying out the travel measurement device, which may be a tape, rope, string, fiber, rod, and/or shaft. The travel measurement device may be flexible, semi-rigid or rigid. The travel measurement device may allow the probe to be paid out and retracted using gravity. Additionally or alternatively, if the travel measurement device is rigid or semi-rigid, it may be used to 'push' the probe through the hole. Regardless of the details of the travel measurement device, the amount it has traveled can be measured at the base station and is directly related to the distance the probe has traveled. The probe 102 is then retracted back to the base station as depicted in arrangement of the device 100d, the locking elements 106 retracted as depicted in arrangement of the device 100e and the portable device removed from the bore.

Although not depicted in FIG. 1, the base station and probe may have interacting orientating structures, such as complementary angled bearing surfaces, that cause the probe to be in the same position and orientation at the start and end of a measurement run. Ensuring that the probe is at the same position and orientation at the start and end of a measurement run allows the device, or more particularly the electronics of the device to account for any drift in sensor measurements. For example, the sensor measurements alone may indicate that the sensor ended the measurement run in a slightly different position/orientation compared to the start, possibly due to the accuracy of the sensors. However, the orienting structures ensure that the probe is in the same physical position and orientation and as such the drift of the sensor measurements may be accounted for and corrected.

Figure 2:
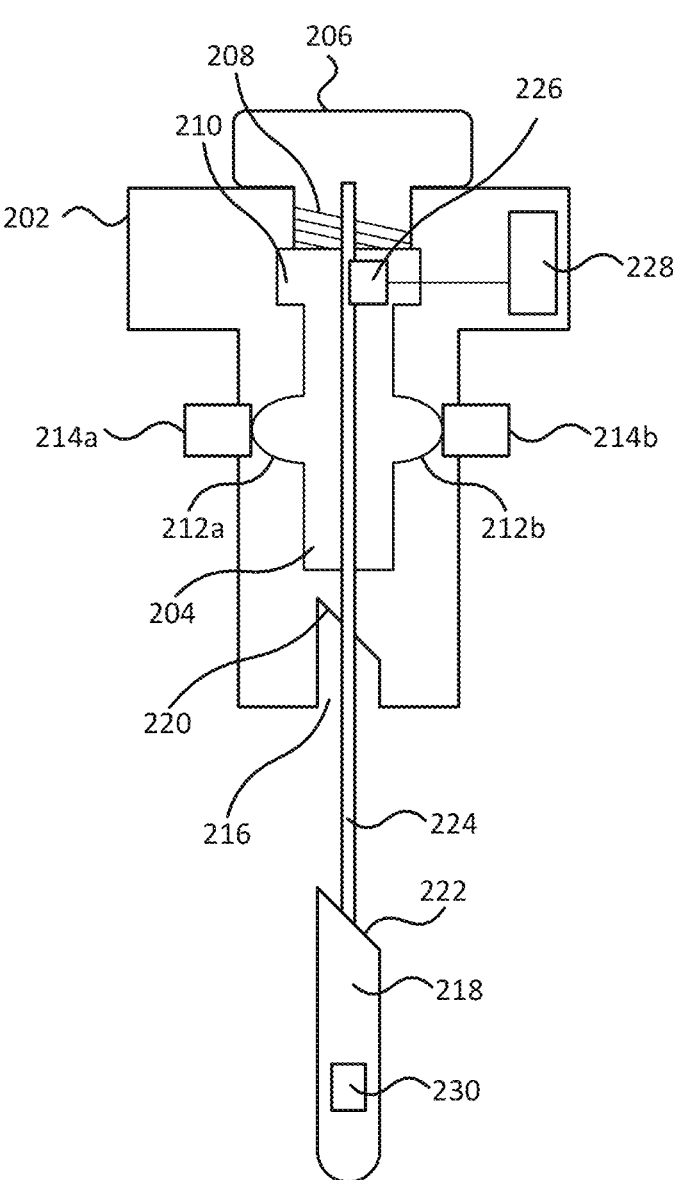
FIG. 2 depicts a block diagram of a bore hole measurement device.

FIG. 2 depicts a block diagram of a bore hole measurement device. The portable bore hole measurement device 200 is similar to the device described above with regard to FIG. 1 and as such not all of the features of the device 200 will be described again in detail. The device 200 is depicted as having a manually operated locking elements. The device 200 comprises a base station that has a housing portion 202 that holds an interior moving piston 204 that can move up and down within the housing. An actuator 206 can be rotatably mounted in the housing 202. The actuator may include a threaded portion 208 that engages with a correspondingly threaded portion 210 of the moveable piston 204. The actuator 206 can be rotated clockwise or counterclockwise which will cause the threaded portion of the moveable piston to move up or down. As depicted the moveable piston may include camming surfaces 212a, 212b that can drive the locking elements 214a, 214b outward and inward as the moveable piston is moved up or down.

The housing 202 includes a probe seating location 216 for at least partially receiving or contacting the probe 218. The probe seating location 216 is depicted as having an angled surface 220 and the probe is depicted as having a correspondingly angled surface 222. Accordingly, as the probe is retracted, for example by retracting the travelling portion of the travel measurement device, which is depicted as a rod 224, the two angled surfaces 220, 222 will engage with each other and cause the probe to rotate into the same position and rotational orientation as the probe is returned to the starting position.

As the probe is passed down the bore hole and retracted back up, the distance of the probe from the base station can be determined from a sensor 226 of the travel measurement device. Electronics 228 within the base station may receive the measurements from the sensors of the probe 230 as well as the sensor 226 of the travel measurement device and fuse the readings together.

The probe or the sensors 230 of the probe may communicate with the electronics 228 in the base station using a wired or wireless communication interface. For example, the probe may use a WiFi or Bluetooth radio to communicate the sensor readings to the base station. The electronics in the base station may detect that the probe has returned to the base station based on the measurement from the travel measurement device and can establish a wireless connection to the probe to download or retrieve the sensor data from the probe. Additionally or alternatively, the probe may include a sensor or switch in order to determine when the probe is seated in the base station, or is in close proximity to the base station and as such may establish a wireless connection to transfer the sensor information. Additionally or alternatively, the probe and base station may continually attempt to establish a wireless connection with the other component, and transfer sensor data when the communication session is established. When the communication session is not established, the probe and base station may store the measurement readings for subsequent transfer once communication is established or re-established.

The device 200 may include one or more wired or wireless communication interfaces for communicating with an external device. The device 200, or more particularly the electronics 228 of the device, may receive the measurement information from the probe sensor(s) and the sensor(s) of the travel measurement device and fuse the measurements together to determine the bore characteristics, which may then be communicated to the external device. Additionally or alternatively, the electronics 228 may communicate the measurement information from both the probe sensor(s) and the sensor(s) of the travel measurement device to the external device, which may fuse the measurement information together. Further still, the probe device may establish a wireless communication session with the external device and the probe may communicate the sensor measurements directly to the external device and the electronics of the base station may communicate the travel measurement readings to the external device. The external device may provide software for using, including displaying, the information collected from the device 200.

A further embodiment of a man-portable device for measuring bore hole characteristics, such as position and orientation information along the bore hole is described further below with reference to FIGS. 3-9.

Figure 3:
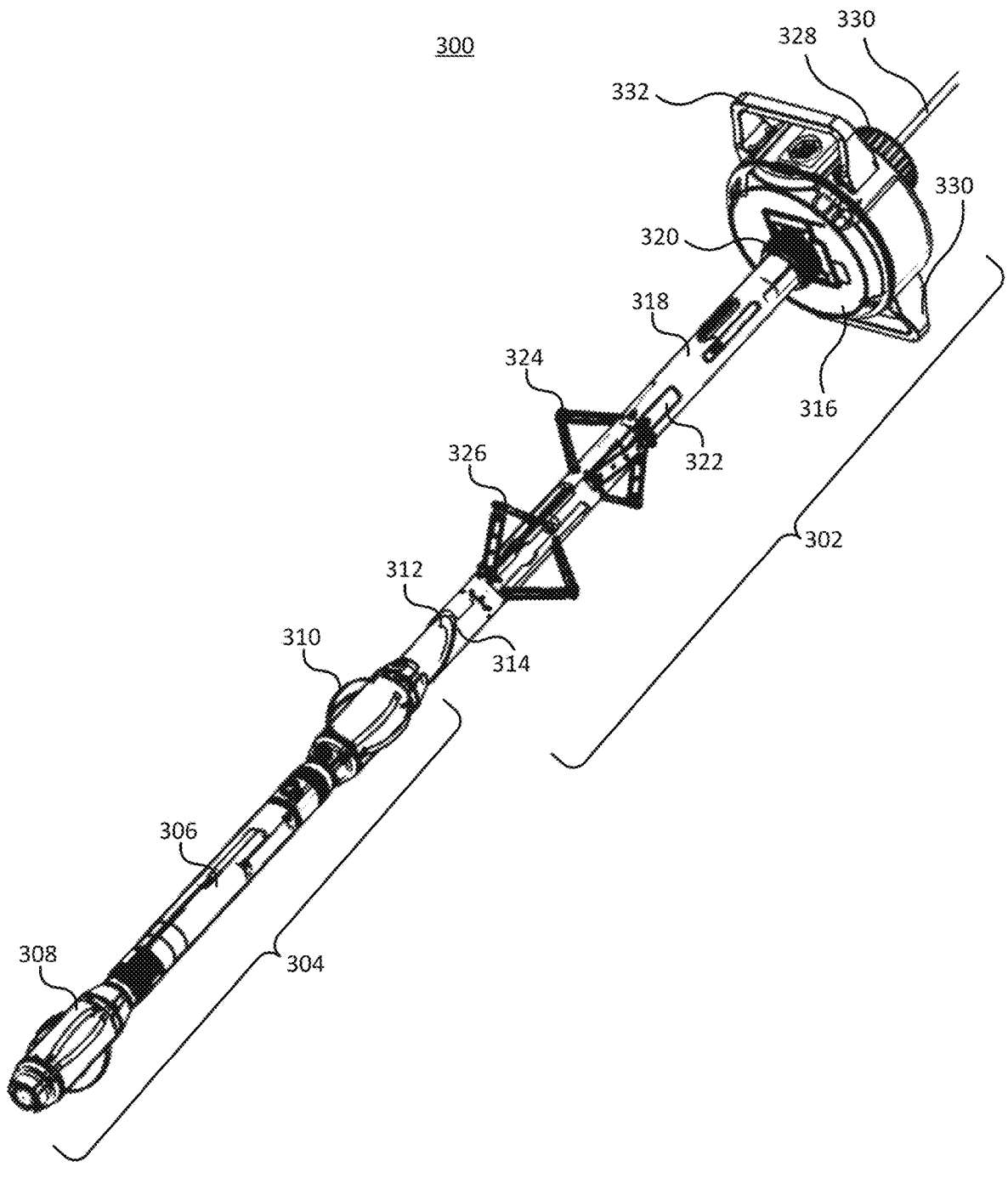
FIG. 3 depicts a schematic of a bore hole measurement device.

FIG. 3 depicts a schematic of a bore hole measurement device. The device 300 is a portable device that can be lifted, maneuvered and operated by a single worker. The device 300 includes an upper base station 302 and a down-hole probe 304. The probe 304 comprises a shaft 306 that may provide a housing for probe sensors, electronics and batteries. In order to center the probe within the bore hole the probe may include centering guides 308, 310 located at one or more points one the probe. As depicted a pair of centering guides are provide at the bottom and top ends of the probe. The centering guides 308, 310 may be secured to the device with a severable connection in order to allow the centering guide(s) to be broken away from the probe in case the centering guide becomes caught or jammed within the bore hole.

An upper portion of the probe has an angled bearing surface 312. The angled bearing surface 312 of the probe contacts a correspondingly angled bearing surface 314 of the base station. As the probe is retracted back to the starting position in the base station, the angled bearing surfaces contact each other and will cause the probe to rotate as it is retracted. The angled bearing surfaces 312, 314 ensure that probe returns to the same rotational position relative to the base station when fully retracted.

The base station 302 has an upper housing 316 that encloses the electronics as well as other components of the base station. The housing 316 is sized such that it does not fit through the bore hole being measured. An in-hole section 318 of the base station 302 can be secured to the housing, such as by a nut 320 or other mechanism. Alternatively, the in-hole section 318 may be formed integrally with a portion of the housing. The in-hole section 318 is fixed in position relative to the housing 316 and may be provided as a pipe or tube within which other components can be received. As described above, the end of the in-hole section 318 may have an angled bearing surface 314 for engaging with a corresponding surface 312 on the probe 304.

The in-hole section 318 of the base station may have a moveable piston 322 located within it. The moveable piston 322 may move up and down within the in-hole section 318 and is used to engage and disengage locking elements 324. As depicted the locking elements comprise a pair of hinged arm sets 324, 326 with each arm set comprising three hinged arms. It will be appreciated that a single set of hinged arms may be used, or possibly more than two. Further, each of the hinged arm sets may have more or less than three hinged arms. Each of the hinged arms in each of the sets comprises a first arm that is pivotally connected to the moveable piston 322 at one end and pivotally connected to a second arm at the opposite end. The other end of the second arm is pivotally connected to the in-hole section 318 of the housing. The hinged arrangement of the arms will cause the hinged arms, or more particularly the pivotal connection between the first and second arms, to extend outward from the in-hole section 318 when the ends of the first and second arms are moved towards each other by moving the moveable piston 322. When the ends of the arms are moved away from each other, the pivotal connection between the two arms is retracted back toward the in-hole section 318. The moveable piston 322 can be moved up and down the in-hole section by an actuator 328. The actuator 328 can be rotated clockwise/counterclockwise and the rotational movement converted to linear movement of the moveable piston 322.

The above has described a mechanical actuator for the locking elements 324, 326 which is believed to provide a simple, yet robust mechanism that can provide reliable operation in potentially harsh conditions in which the device may be expected to operate. It will be appreciated that alternative locking elements and actuators may be provided. For example, the moveable piston may rotate rather than move up and down and may have a threaded portions upon which nuts are arranged with the moveable arms to the hinged arms connected to the nuts to translate the rotation of the moveable piston to linear motion of the hinged arms. Other arrangements for actuating the locking elements may be provided including the use of motors, linear actuators, electromagnetics etc. Further, the locking elements may be provided by for example an inflatable member that can be inflated/deflated in order to engage/disengage the bore walls.

The device 300 includes a pair of handles 330, 332 to facilitate the carrying and maneuvering of the device 300. Once secured to a bore hole, the probe may be lowered down the bore hole. The probe may need to be pushed, or otherwise driven through the bore hole which may be done in various ways. The device 300 is depicted as using a flexible, semi-rigid rod 334, for pushing the probe 302 down the bore hole and retracting it back up to the base station 302. The rod 334 extends through the actuator 328, through the moveable piston and can be connected to the probe. As will be appreciated, linear movement of the rod will translate to linear movement of the probe within the hole. The rod may be flexible for example to allow it to be spooled on a role, however should not have significant stretch or compression. As described further with particular reference to FIGS. 7 and 8, the position of the rod 334, and how much of the rod has been paid out/retracted can be measured by a travel sensor (not visible in FIG. 3) of the device 300.

Figure 4:
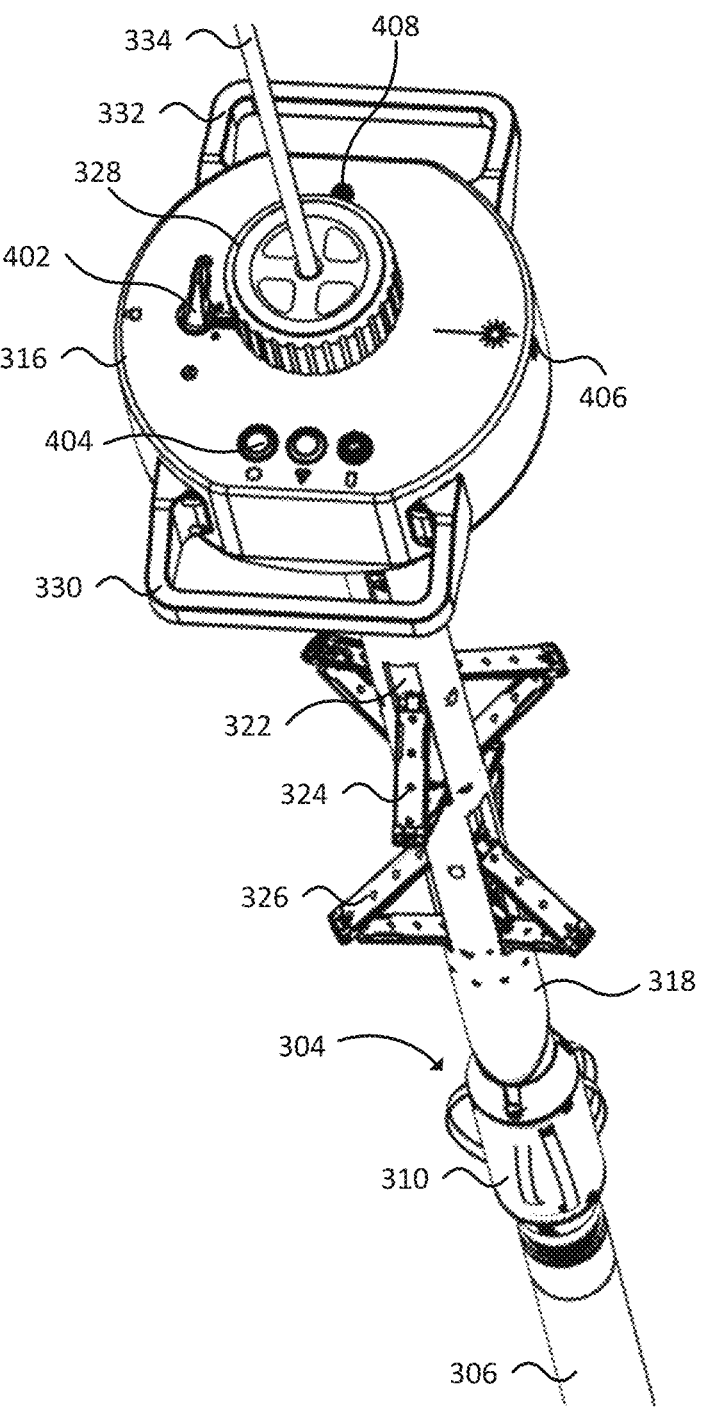
FIG. 4 depicts a top view of an upper portion of the bore hole measurement device of FIG. 3.

FIG. 4 depicts a top view of an upper portion of the bore hole measurement device of FIG. 3. The same reference numbers are used in FIG. 4 for the same components described above in FIG. 3 and as such are not described in further detail. The actuator 328 may be a rotating wheel whose rotation in one direction causes the moveable piston to move up (or down) and rotation in the other direction causes the moveable piston to move down (or up). A selectable lever 402 may be provided on the housing to engage a ratcheting mechanism. In a first position, the selectable lever and ratcheting mechanism will only allow rotation in one direction, for example for engaging the locking elements. In a second position the selectable lever 402 and ratcheting mechanism will only allow rotation in the other direction, for example for disengaging the locking elements. Further, the selectable lever may have a locked position that prevents rotation of the actuator 328.

The housing 316 may provide one or more interface components 404 for controlling the operation of the device 300. The interface components may include for example buttons, switches, etc. as well as one or more lights, displays, speakers, etc.

The device 300 may be used to precisely determine position and orientation information of a bore hole. However, these measurements are determined relative to the base station. In order to locate the measurements in an actual environment, the position and orientation of the device 300 in the actual environment needs to be determined. In order to determine the position/orientation of the device 300, it may include a laser 406 that projects a laser beam that can be used to determine the position/orientation of the device relative to objects in the environment whose position/orientation are known. Additionally or alternatively, the device 300 may include a mounting point 408 for mounting a locating device such as a laser or a reflecting survey prism (not shown).

Figure 5:
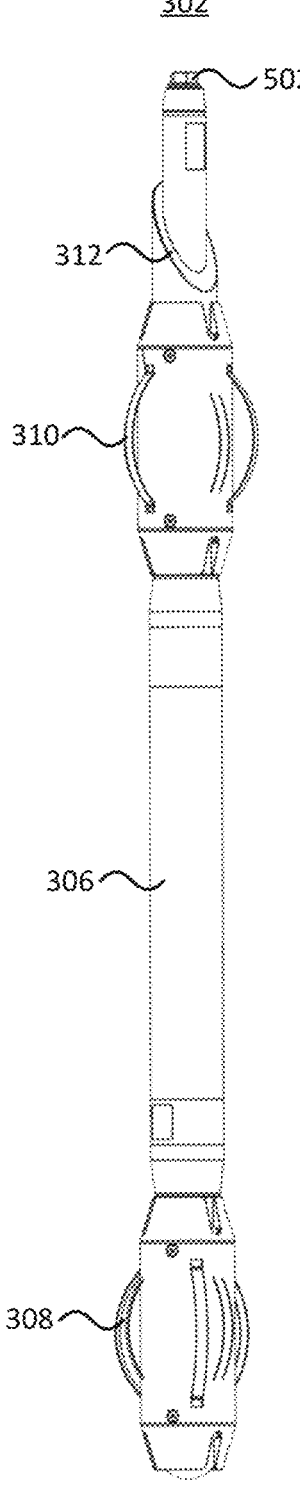
FIG. 5 depicts a schematic of a down hole probe of the bore hole measurement device of FIG. 3.

FIG. 5 depicts a schematic of a down hole probe of the bore hole measurement device of FIG. 3. The same reference numbers are used in FIG. 5 for the same components described above in FIGS. 3 and 4 and as such are not described in further detail. The down hole probe 302 comprises an attachment point 502 located at the base station end. The attachment point allows the rod of the moving portion of the travel measurement device to be securely attached to the probe allowing the rod to push the probe down the hole and pull it back up. As the probe is retracted back to the base station the attachment point 502 may be received within a portion of the in-hole section 318 and the angled bearing surface 312 can bear against a corresponding surface causing the probe to rotate into a known position and orientation.

Figure 6:
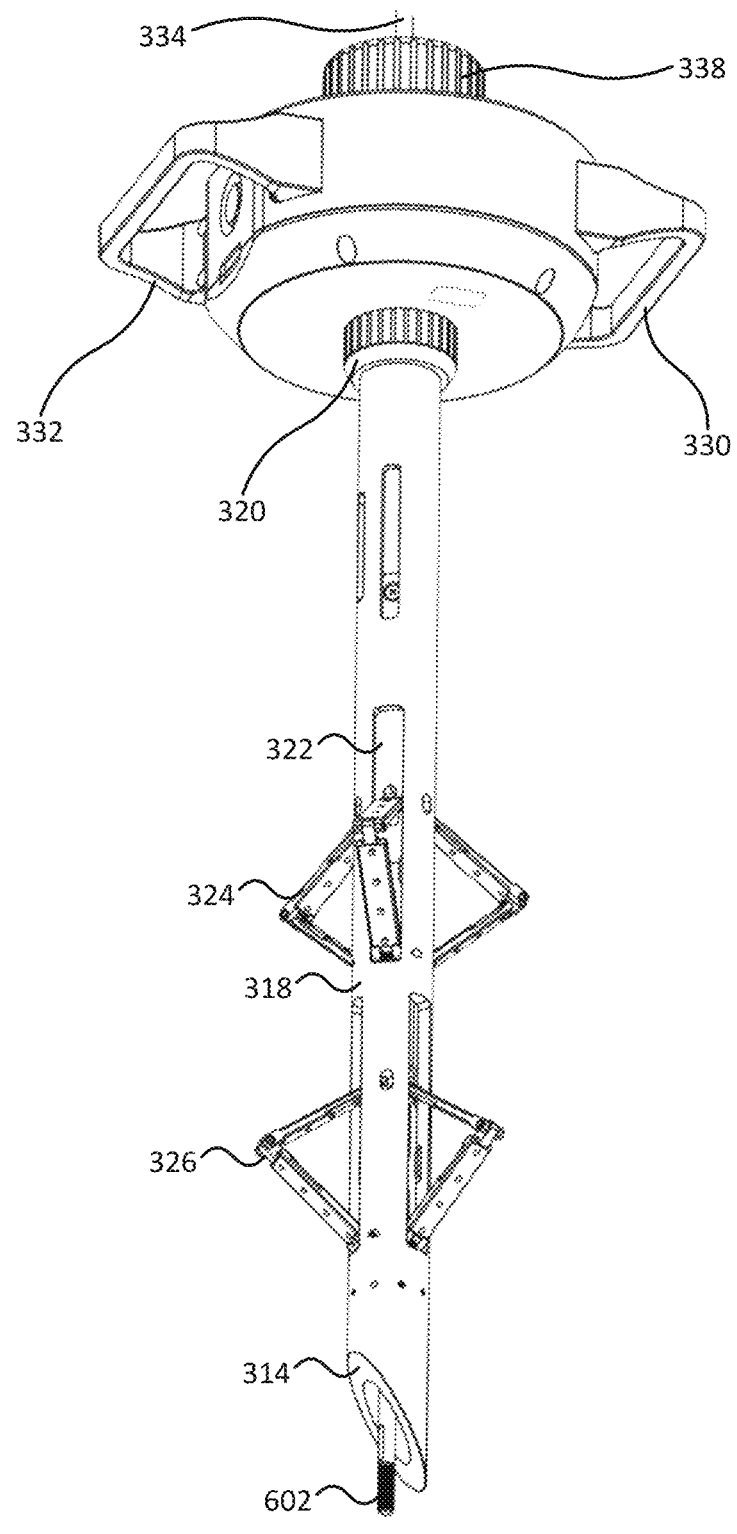
FIG. 6 depicts a schematic of a base station of the bore hole measurement device of FIG. 3.

FIG. 6 depicts a schematic of a base station of the bore hole measurement device of FIG. 3. The same reference numbers are used in FIG. 6 for the same components described above in FIGS. 3-5 and as such are not described in further detail. The travel measurement rod 334 extends through the actuator on the housing and through both the in-hole section 318 of the base as well as the moveable piston 322. The travel measurement rod 334 can extend out through a bottom of the in-hole section 318. A bottom of the rod 602 is adapted for securing to the probe. As depicted, the rod 334 may have a threaded portion that can be secured to the probe.

Figure 7:
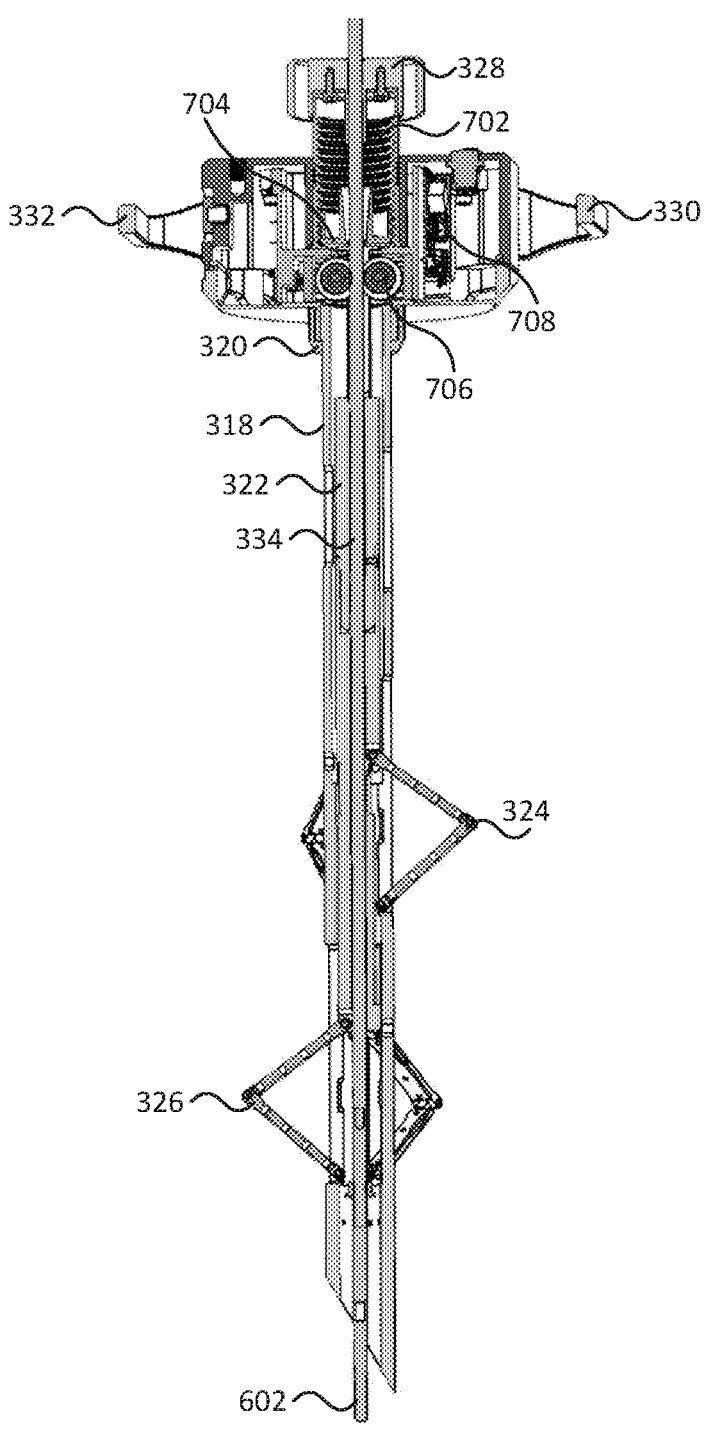
FIG. 7 depicts a cross section of the base station of FIG. 6.

FIG. 7 depicts a cross section of the base station of FIG. 6. The same reference numbers are used in FIG. 7 for the same components described above in FIGS. 3-6 and as such are not described in further detail. As described above, the device may use a manually operated wheel actuator 328 the rotation of which causes the moveable piston 322 to move up and down within a fixed in-hole portion 318 of the housing. Opposite ends of hinged arms 324, 326 are secured to respective ones of the fixed in-hole portion 318 and to the moveable piston 322. The wheel actuator 328 is secured to a threaded sleeve 702, so that when the wheel actuator 328 is rotated the threaded sleeve 702 also rotates. The threaded sleeve is depicted as having threads formed on the interior of the sleeve, however it will be appreciated that the threads could be arranged on the outside of the sleeve. A threaded moveable block 704 is engaged with the threaded sleeve and is prevented from rotation so that when the threaded sleeve is rotated, the threaded moveable block will move up or down. The moveable piston 322 is secured to the threaded moveable block so that movement of the block 704 translates to movement of the moveable piston 322.

As depicted, the moveable block 704 and the wheel actuator 328 have a hole through which the rod 334 passes. The rod, passes through the center of the device and can be attached at one end 602 to the probe. As the rod is paid out or retracted through the device, it passes through a pair of rollers 706. The rollers 706 engage the rod such that movement of the rod causes rotation of the rollers 706. The rotation of the rollers can be measured and translated into a linear measurement of the movement of the rod, which corresponds to the distance of the probe from the start and end position/orientation. The housing also encloses the electronics 708 of the device.

Figure 8:
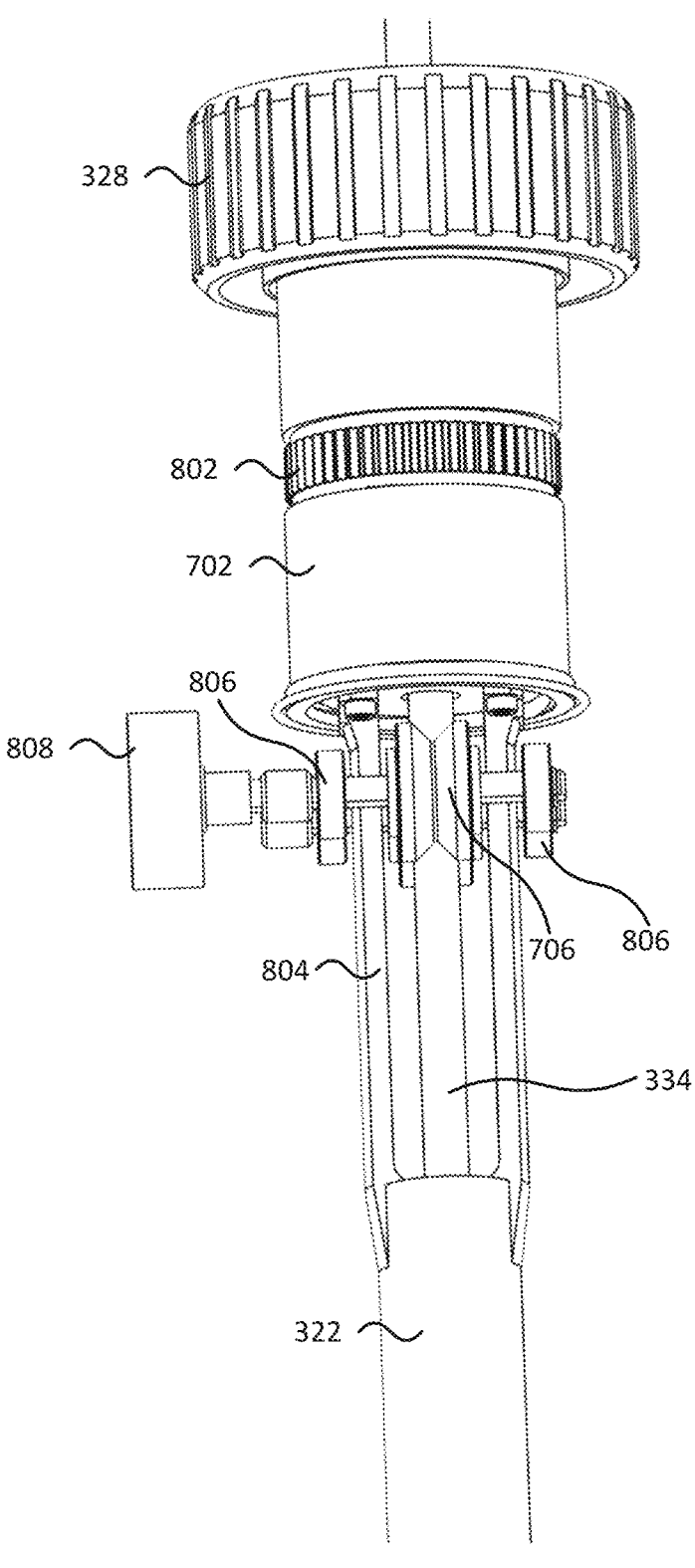
FIG. 8 depicts inner details of the base station of FIG. 6.

FIG. 8 depicts inner details of the base station of FIG. 6. The same reference numbers are used in FIG. 8 for the same components described above in FIGS. 3-7 and as such are not described in further detail. It will be appreciated that additional structures and elements are not depicted in FIG. 8 for clarity of the drawing. The wheel actuator 328 is secured to a threaded sleeve 702. The threaded sleeve comprises internal threads which are not visible in FIG. 8. An outer surface of the threaded sleeve 702 includes a ratcheting portion 802 that can engage with a ratcheting mechanism to allow and/or prevent rotation of the sleeve. The threaded moving block is received within the threaded sleeve and attached to the moveable piston 322 by one or more posts 804. The posts may be captured by one or more elements such as a support structure (not depicted) for the roller bearings 806 which will prevent rotation of the moveable piston and the attached threaded moveable block. With the rotation of the moveable block prevented, the moveable block will extend/retract within the threaded sleeve when the sleeve is rotated.

The rod 334 extends through the sleeve 702 and threaded moving block. A pair of rollers 706, only one of which is visible, are arranged on opposite sides of the rod and engage the rod so that as the rod moves, the rollers 706 rotate. A rotational encoder 808 may be connected to the rollers by a shaft supported by roller bearings 806 in order to measure the rotation of the rollers, and so determine the movement of the rod 334.

FIG. 9 depicts further inner details of the base station of FIG. 6. The same reference numbers are used in FIG. 9 for the same components described above in FIGS. 3-8 and as such are not described in further detail. FIG. 9 presents the same view as FIG. 8 but with the threaded sleeve removed. The threaded moveable block 704 that is received within the threaded sleeve is attached to the moveable piston, for example using one or more screws or bolts 902.

The above has descried various embodiments of a portable bore hole measurement device that has a down hole sensor probe and base station that can be secured over bore hole. The probe is connected to a measurement device that allows distance from the probe to the base station to be determined. The use of the measurement device to measure the actual distance of the probe from the base station, which is fixed in position relative to the bore, can help improve the accuracy of the measurements. Although various embodiments of the portable bore hole measurement device have been described, it will be appreciated that the specific details provided are intended only to teach particular embodiments of the portable bore hole measurement device and one of ordinary skill in the art will appreciate that changes can be made to features and components.

Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A portable bore measurement device comprising:
   a probe sized to move down and up a bore to be measured, the probe comprising one or more sensors for measuring one or more bore characteristics; and
   a base for placement at least partially over the bore to be measured, the base comprising:
   a locking element for securing the base relative to the bore wherein the locking element device centers a probe mount of the base within the bore and secures the base to the bore; and
   a probe travel measurement device connected to the probe for determining a distance the probe has moved within the bore relative to the base, the probe travel measurement device comprises:
   at least one of a rod, tape, rope, string, fiber, and shaft secured to the probe; and
   a sensor in the base to measure an amount of the at least one of a rod, tape, rope, string, fiber, and shaft paid out or retrieved when the probe moves down or up the bore.

2. The device of claim 1, wherein the locking element comprises a plurality of hinged arms that can be extended radially outwards from a portion of the base located within the hole by reducing a distance between a lower portion of the hinged arms and an upper portion of the hinged arms.

3. The device of claim 2, further comprising:
   a threaded sleeve;
   an actuator wheel rotatably mounted in the base and attached to the threaded sleeve;
   a threaded moving block engaged with the threaded sleeve to translate the rotational movement of the threaded sleeve to linear motion of the threaded moving block; and a moveable piston located within an in-hole portion of the base and secured to the threaded moving block, wherein first ends of the hinged arms are pivotally attached to the moveable piston and second ends of the hinged arms are pivotally attached to a fixed portion of the in-hole portion of the base.

4. The device of claim 1, wherein the locking element device comprise one or more extendable supports that can be extended to contact walls of the bore.

5. The device of claim 1, wherein the locking element device comprise an inflatable section of a portion of the base located within the hole that can be inflated to contact walls of the bore.

6. The device of claim 1, wherein the locking element device is operated by an electrically controlled actuator.

7. The device of claim 1, wherein the locking element device is operated by a manual actuator located on an external portion of the base when the base is placed at least partially over the bore.

8. The device of claim 1, wherein the probe comprises one or more centering devices for centering the probe within the bore.

9. The device of claim 8, wherein the one or more centering devices of the probe are detachable from the probe.

10. The device of claim 1, wherein the at least one of a rod, tape, rope, string, fiber, and shaft is used to retract the probe to the base.

11. The device of claim 10, wherein the at least one of the rod, tape, rope, string, fiber, and shaft is the rod and is used to extend the probe from the base through the bore.

12. The device of claim 11, wherein the rod comprises a rigid or semi-rigid rod that extends out through the base.

13. The device of claim 12, wherein the rod comprises a plurality of rigid or semi-rigid rod sections that can be secured together end-to-end.

14. The device of claim 12, wherein the rod engages a roller causing the roller to rotate as the rod is paid out and retracted, the probe travel measurement device comprising a rotational encoder for determining an amount of rotation of the roller.

15. The device of claim 1, wherein the at least one of a rod, tape, rope, string, fiber, and shaft is the tape and wherein the tape is retractable onto a spool.

16. The device of claim 1, wherein the base comprises an in-hole section that comprises a probe mount with an engagement surface that orients the probe into a known position and orientation when the probe is retracted onto the probe mount.

17. The device of claim 16, wherein the engagement surface of the in-hole section comprises an angled bearing surface and wherein the probe comprises a corresponding angled bearing surface.

18. The device of claim 1, wherein the base comprises electronics for collecting measurements of the device including the distance from the base to the probe determined from the probe travel measurement device and one or more orientation measurements determined from the one or more sensors of the probe.

19. The device of claim 1, wherein the one or more sensors of the probe comprise one or more of:

a magnetometer;

an inertial measurement unit;

an accelerometer;

a gyroscope; and a laser.

20. A portable bore measurement device comprising:

a probe sized to move down and up a bore to be measured, the probe comprising one or more sensors for measuring one or more bore characteristics; and a base for placement at least partially over the bore to be measured, the base comprising:

a locking element for securing the base relative to the bore; and a probe travel measurement device connected to the probe for determining a distance the probe has moved within the bore relative to the base, the probe travel measurement device comprises:

at least one of a rod, tape, rope, string, fiber, and shaft secured to the probe; and a sensor in the base to measure an amount of the at least one of a rod, tape, rope, string, fiber, and shaft paid out or recovered as the probe moves down or up the bore, wherein the base comprises an in-hole section that comprises a probe mount with an engagement surface that orients the probe into a known position and orientation when the probe is retracted onto the probe mount.

* * * * *